Patented July 3, 1934

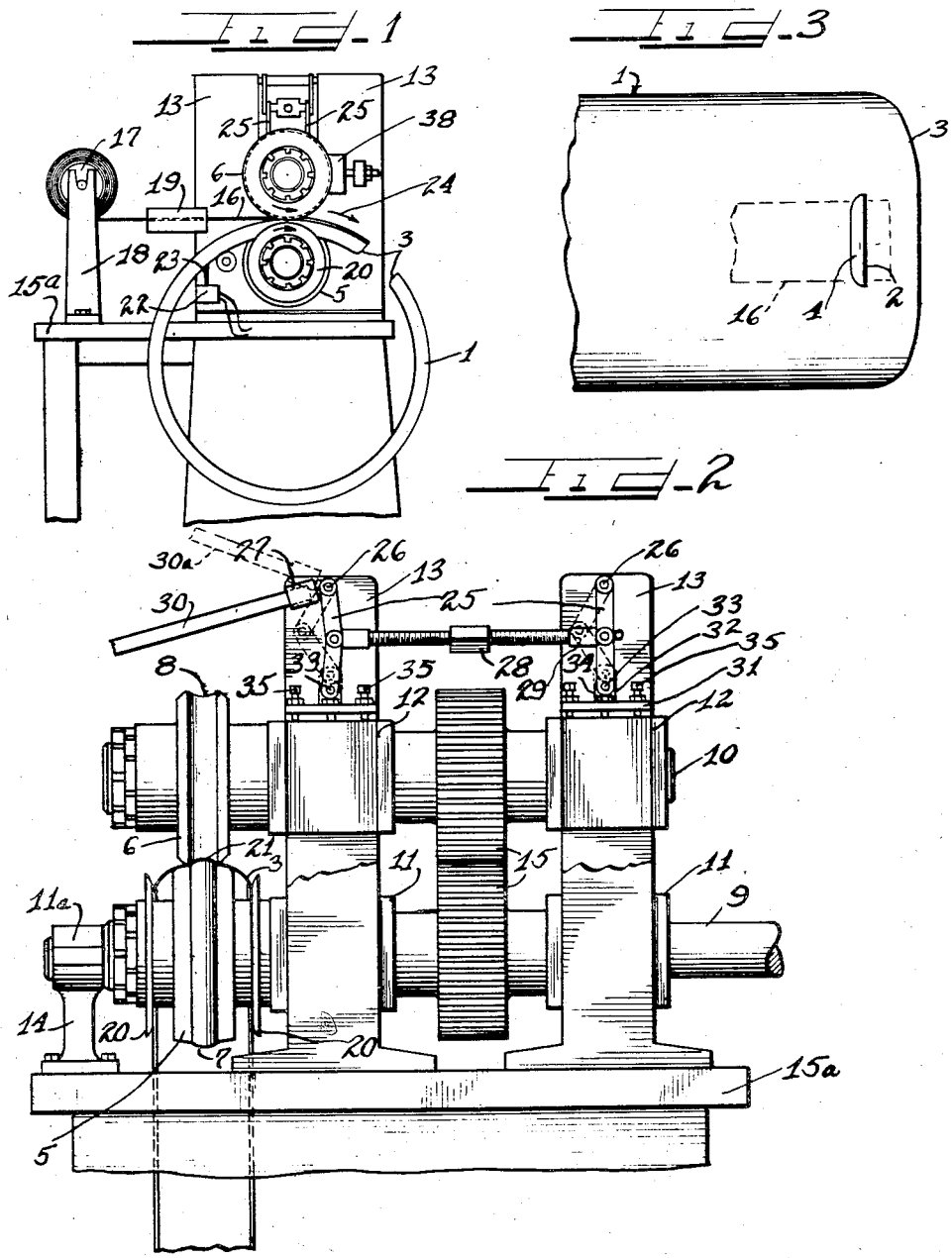

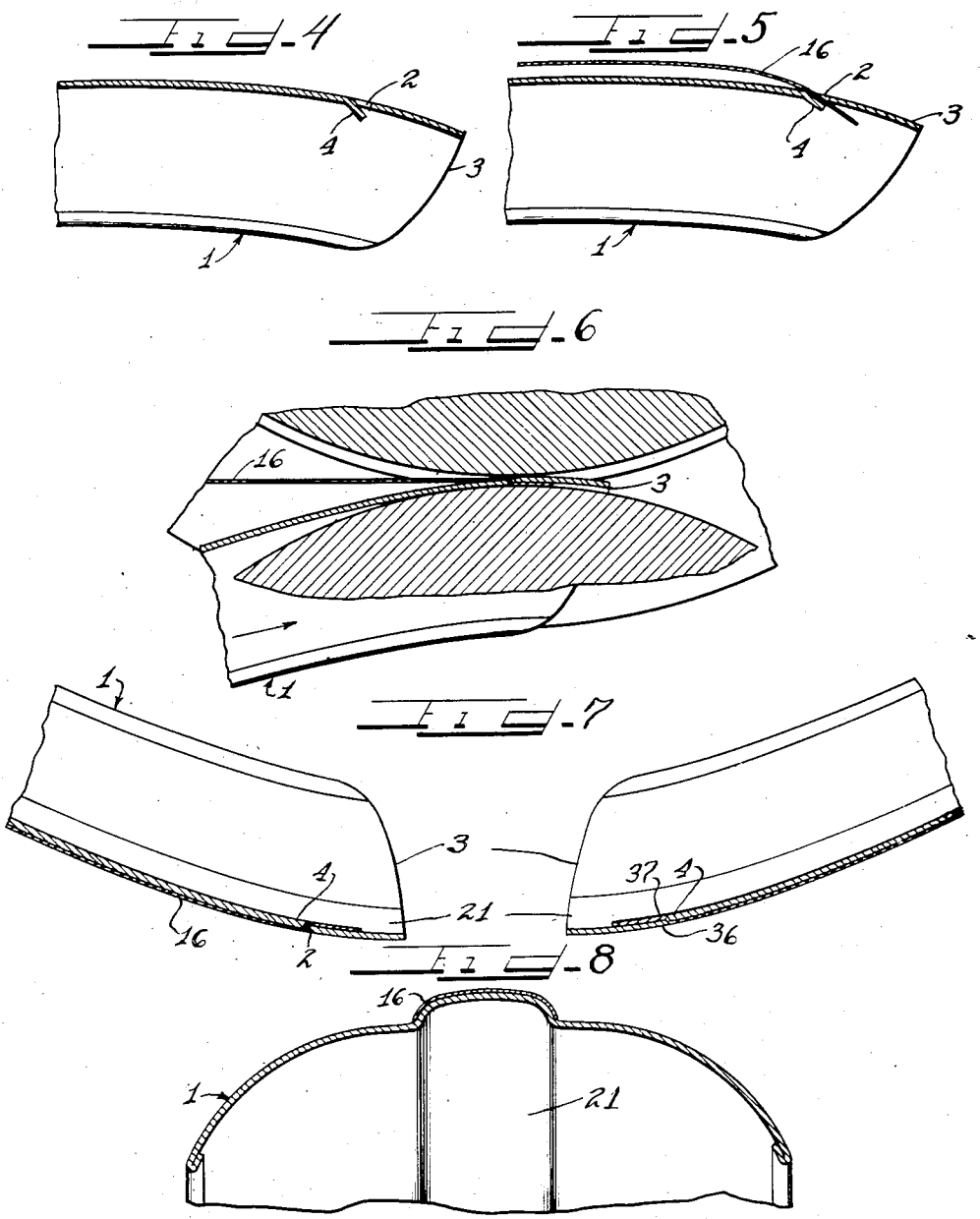

1,965,533

UNITED STATES PATENT OFFICE 1,965,533

METHOD OF AND APPARATUS FOR APPLYING BEADING TO TIRE COVERS

George Albert Lyon, Allenhurst, N. J., assignor to Lyon Incorporated, Asbury Park, N. J., a corporation of Delaware Application November 20, 1931, Serial No. 576,335

16 Claims. (Cl. 153—2)

This invention has to do with molding or beading for tire covers, particularly of that character embodying an outer ring or rim for overlying the tread of a tire.

One of the principal objects of this invention resides in a novel method by which molding or beading is secured to a tire cover rim of the character referred to.

Another object of the invention resides in a method by which a tire cover rim is formed for the reception of molding or beading and the latter is formed and applied to the rim simultaneously.

It is a further object of this invention to provide a method embodying the application of molding or beading to tire cover rims or the like successively with a minimum loss of time.

It is another object of the invention to provide a machine or apparatus for carrying out methods forming other objects of this invention.

In accordance with the general features of the invention, there is provided a pair of cooperating forming rolls arranged to be driven simultaneously. Means cooperating with the rolls is employed to cause relative movement between the rolls to accommodate different thicknesses of metal passing between the rolls, and to keep the rolls in operative and inoperative positions.

The rim-like tire cover is provided adjacent its ends with openings such as slits. A strip of molding is conducted from a spool or from a buffing machine and is guided by suitable adjustable guide means to move in a path substantially tangent to the rolls. One end of the tape or beading is slipped through the opening at one end of the tire cover rim and the latter is then positioned between the rolls, which are thereupon caused to rotate, thereby forming a substantially central rib of concavo-convex formation in the rim and at the same time imparting a corresponding shape to the beading and forcing the same onto the rib or the rim. This is continued until a point somewhat spaced from the opposite end of the cover rim is reached, whereupon, by an automatic switch construction, the rolls are automatically stopped. At this point, the beading is cut off so that it may be positioned by hand with its end passed through the corresponding slit in the rim but preferably does not project beyond the end of the rim. The rolls are thereupon again caused to move, to complete the beading applying operation. Suitable guides are preferably employed for properly guiding the cover rim without marring the surface thereof.

Further objects and advantages of the invention will appear as the description proceeds.

On the drawings:

Figure 1 shows diagrammatically an arrangement for carrying out the method forming the subject matter of the present invention.

Figure 2 is an enlarged fragmentary view of that portion of the apparatus embodying the forming rolls.

Figure 3 is an enlarged fragmentary view of one end of a tire cover rim after the first step in the process.

Figure 4 is a fragmentary sectional view taken approximately in the plane indicated by the line IV—IV in Figure 3.

Figure 5 is a view similar to Figure 4 but with one end of a strip of beading inserted through the slot adjacent the end of the cover member.

Figure 6 is an enlarged fragmentary sectional view showing how the forming rolls force the beading on the cover member.

Figure 7 is a fragmentary sectional view showing the ends of a tire cover rim with the strip of beading attached thereto.

Figure 8 is an enlarged fragmentary transverse sectional view of a tire cover rim which has been formed with a rib and a strip of beading applied to the rib.

Referring now more particularly to the drawings, wherein the same parts are designated throughout by the same reference characters, the numeral 1 indicates a preferably metallic tire cover in the form of a split ring or rim. For the purpose of the present invention, the ring or rim 1 is preliminarily punched at 2 adjacent its ends 3 to provide anchor portions 4. A pair of cooperating male and female forming rolls 5 and 6 provided respectively with a circumferential transversely arcuate rib 7 and groove 8 are rotated simultaneously. For a purpose to be hereinafter more fully explained, the pitch diameter of the female roll 6 is somewhat less than that of the male roll 5, or the various parts are otherwise suitably constructed so that the surface speed of the female roll will be somewhat less than that of the male roll 5. The rolls 5 and 6 are carried by shafts 9 and 10, one of the shafts being preferably actuated from a motor or the like (not shown).

The shafts 9 and 10 are supported in suitable bearings 11, 11a and 12. The bearings 11 and 12 are disposed between standards 13, the bearing 11a being associated with a bearing bracket 14, all carried by a frame 15a. Simultaneous rotation of the rolls 5 and 6 is attained through the employment of intermeshing gears 15 carried by the respective shafts 9 and 10. The gears 15 may be of the same size, but if different sizes, the rolls 5 and 6 should be correspondingly constructed so that in operation the female roll 6 will drag somewhat behind the male roll 5.

The rolls 5 and 6 are arranged so that the co-operating rib and groove portions 7 and 8 are separated by substantially the combined thickness of the rim member 1 and the molding or beading 16 to be secured thereto. The strip 16 is preferably of sheet metal of the general character used in steel tapes and the like, and in passing between the rolls 5 and 6 it is given an arcuate cross-sectional shape corresponding with that of the portions 7 and 8.

The strip 16, when reaching the rolls 5 and 6, has preferably a fairly high degree of polish on its upper surface, and may issue directly from a buffing machine or may be carried on a drum or bobbin 17 supported by standards 18. Whatever the source of supply may be, the strip 16 is conducted through a guide 19 suitably secured to the frame of the machine, or otherwise, said guide being preferably adjustable to accommodate strips of various sizes and shapes. The guide 19 is preferably so adjusted that it maintains the strip 16 substantially tangent to the rolls 5 and 6.

Arranged on opposite sides of the male roll 5, are preferably discs of such material as wood, fiber or the like, which are spaced apart by substantially the width of the tire cover member 1. While but one set of discs 20 is shown, it is to be understood that as many such discs or guiding elements may be employed as is deemed desirable in order to properly guide the entire length of the tire cover member 1 between the forming rolls 5 and 6 to insure proper location of the rib 21 to be formed therein. By employing relatively soft material in the discs 20, marring of the polished or enameled surface of the tire cover rim 1 is avoided.

Located at one side of the lower roll 5 is a normally open switch 22 embodying a spring pressed switch plunger 23. This switch controls the forming rolls 5 and 6 through a motor or the like (not shown), and is so positioned that the uppermost portion of the plunger 23 is normally in the path of movement of the cover rim 1 as the same is passing between the rolls 5 and 6. Consequently, when the rim is in this position, it overlies and depresses the plunger 23 and as long as this condition exists the switch is closed and the rolls 5 and 6 are drawing the rim 1 in the direction of the arrow 24 in Figure 1.

The bearings 12 about the shaft 10, on which the female forming roll 6 is carried, are supported by toggles 25 from pivots 26 carried by the standards 13. One of the toggles 25 includes a bell crank lever 27. A handle 30 is connected to the bell crank lever 27, and the toggles 25 are connected for simultaneous operation by an oppositely threaded member 28 received in sockets 29, associated with the toggles 25. As shown in Figure 2, the toggles are slightly beyond dead center, signifying that the female roll 6 is in position for cooperation with the male roll 5 for forming the rib 21 and applying the strip 16 thereto. The female roll 6 is elevated to inoperative position upon movement of the arm 30 of the bell crank lever 27 to the position shown in dotted lines at 30a.

The bearings 12 are connected to the toggles 25 for adjustment relative thereto. To this end, a plate 31 has an upstanding bracket 32 pivoted to the lower end of the toggle 25 at 33, and is suspended from the member 31 by bolts 34. Adjusting screws 35 are associated with the plate or leg member 31 and bear upon the bearing members 12. When it is desired to vary the distance of the bearing members 12 from the plate 31, and thereby vary the working position of the female roll 6 relative to the male roll 5 to accommodate metal of various thicknesses, the bolts 34 and adjusting screws 35 are manipulated.

The gears 15 are formed with deep intermeshing teeth, the depth being such that said gears are intermeshed while the female roll 6 is in retracted or inoperative position as well as when the same is in operative position.

If desired, the spring pressed plunger 23 could form part of a clutch mechanism of such construction that, when the plunger 23 is compressed as shown in Figure 1, the gears 15 are rotating, and when pressure is released, the clutch is thrown "out" and the gears 15 stopped.

The operation of the machine or apparatus embodying the invention is as follows:

A suitable tool such as a punch is applied adjacent the ends 3 of the tire cover rim 1 and the portions 4 struck out as shown, thereby forming slits 2. Each slit is located preferably transversely of the rim 1 and centrally thereof. One end 3 is thereupon placed near the guide 19, and the free end of the strip 16 is slipped or threaded through the slit or opening 2 as shown in dotted lines in Figure 3 and full lines in Figure 5. Said end 3 is then positioned for entering between the forming rolls 5 and 6, the handle or arm 30 is moved from its dotted inoperative position 30a, as seen in Figure 2, to its full line position, so that the female roll 6 is positioned in cooperative relation to the male roll 5. The rim member 1 is allowed to rest upon the switch plunger 23, thereby closing the circuit, or throwing "in" in the clutch (not shown) whereby the rolls are caused to rotate in the directions indicated by the arrows in Figure 1. The rim member 1 is then placed in contact with and between the rolls 5 and 6, and the latter act to feed or draw the member 1, together with the strip 16, in the direction indicated by the arrow at 24 in Figure 1. This action of the rolls produces simultaneously a rib 21 in the member 1 and a transverse corresponding curvature in the strip 16 in embracing relation to the rib 21, and due to the fact that the female roll 6 drags or lags behind the male roll 5, the consequent tension insures a proper securing of the strip 16 over the rib 21. Such additional guiding discs 20 as are deemed necessary to the proper operation of the apparatus serve to keep the center of the member 1 directly below the strip 16 issuing from the guides 19, and as the member 1 and the portion of the strip 16 being secured thereto progress, the rib 21 is formed throughout the major portion of the member 1 until the latter moves beyond the plunger 23. At that instant, the plunger 23 rises and opens the switch 22, thereby bringing the rolls 5 and 6 to rest. The guides 19 are so arranged that shears may be applied to the strip 16 adjacent the forward end of the guides 19 to cut off the strip, the latter being of such length as to be slipped or threaded through the slit or opening 2 in the adjacent end of the member 1 but not projecting therebeyond. The end of the strip now occupies a position similar to the end of the strip initially applied to the opposite end of the rim 1 as shown in Figure 5. The plunger 23 is thereupon depressed by hand, whereupon the rolls 5 and 6 are operated and the remainder of the rim 1 progressed thereby as before. Upon completion of the forming operation, the rim 1 with the strip 16 applied thereto will have the appearance shown in Figures 7 and 8. It will be now noted that the anchor portion 4 adjacent each end 3 of the rim 1 has been forced by the rolls to lie substantially flush with the portion from which it was initially struck, and that it is disposed slightly below the extreme end portions of the rib 21. The free end of each portion 4 is jammed tightly against the adjacent portion of the strip 16, and the juxtaposed extremity 36 of the end of the rib 21 is jammed against the adjacent portion 37 of the strip 16. The ends of the strip 16 are thus firmly and permanently united with the rib 21 and covers the intermediate portion of the same completely. The strip material 16 is preferably fairly thin, compared to the material of which the rim member 1 is made, and when the strip is in position, its outer surface is substantially flush with that of the cover or rim 1 as shown at 36 in Figure 7. This is especially clear in Figures 6 and 7.

The strip material 16 is also sufficiently soft to obviate breaking at 37 when it is interlocked with the rib 21, and yet is sufficiently hard to take the desired degree of polish on its outer surface. In this connection, it will be appreciated that during the rolling operation, a certain degree of hardness is imparted to the surface of the strip 16 by the female roll 6 engaging the same, and it is to be understood that the initial softness of the material 16 is such that the increase in hardness imparted thereto by the female roll 6 will not be sufficient to render the same brittle, so that a dependable connection between the ends of the strip 16 and the corresponding ends of the rib is insured.

In the event the rib 1 is enameled prior to application of the strip 16 thereto, it may be possible that chips from the enamel will adhere to the female roll and thereafter be the cause of injury to the surface of the strip when forced thereinto by the female roll. This may be obviated by the application of a wiper 38 preferably adjacent the portion of the female roll leaving the rim 1. Also if desired, lubricant may be applied to the female roll 6, so that the resultant film will separate the upper surface of the strip 16 from the female roll 6, thereby substantially reducing the hardening effect of the roll upon the surface of the strip 16.

It will be seen from the foregoing that in accordance with the present invention, the method herein employed for producing a tire cover of enhanced appearance by the application of molding or beading thereto is extremely simple since it involves few steps performed by an apparatus with the aid of an unskilled attendant. The apparatus itself is extremely simple, involving a minimum of parts which are extremely unlikely to get out of order or require repair or replacement.

It will be appreciated that the apparatus herein disclosed is for the most part diagrammatic, and is merely illustrative of one of any number of apparatuses which may be employed for carrying out my novel method. The application of molding in accordance with this invention is not limited to split ring covers, but may be employed with a continuous ring, in which event some suitable anchorage means will be provided for the ends of the strips.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The method of attaching a strip of molding to a tire cover, comprising the steps of striking out tongues adjacent the ends of the tire cover to provide anchorages, inserting an end of a strip of molding through one of the openings caused by striking out said tongues, and simultaneously rolling a rib longitudinally of the tire cover and pressing said strip against the rib, causing said tongues to partially occupy said openings.

2. The method of attaching a strip of molding to a tire cover, comprising the steps of forming a transversely arcuate rib longitudinally in the cover and at the same time imparting a transversely arcuate shape of substantially the same curvature to a strip of molding and forcing the same into tight engagement with said rib, and securing the ends of the strip to the ends of the cover under tension.

3. The method of attaching a strip of molding to a tire cover, comprising the steps of forming openings adjacent the ends of the cover, inserting one end of the strip through one opening from the outer side to the inner side of the cover so that the end of the strip underlies the end of the cover, simultaneously forming in the tire cover a rib and forcing the strip about the rib to a point short of the other opening, cutting off the strip so that it falls short of the other end of the cover, inserting the cut off end of the strip through the opening at said other end, and then continuing the operation of forming the rib and forcing the strip thereabout until the other end of the cover is reached.

4. The method of attaching a strip of molding to a tire cover, comprising the steps of securing an end of the strip to an end of the cover, simultaneously forming a transversely arcuate longitudinal rib in the cover and imparting to the strip a transversely arcuate shape of the same curvature as the rib and forcing the strip into tight engagement with the rib with a substantial degree of tension, and securing the other end of the strip to the other end of the cover.

5. The method of attaching a strip of molding or beading to a tire cover which comprises the steps of forming a strip of molding of a length which is not in excess of the length of the cover, imparting to the strip a transversely arcuate shape, and at the same time forming a transversely arcuate rib in the tire cover and forcing the strip to embrace said rib, and securing the other end of the strip to the cover adjacent the corresponding end of the rib.

6. An apparatus for applying a strip of molding or beading to a tire cover, comprising cooperating male and female rolls having transversely arcuate facing peripheral rib and groove portions, to simultaneously form a transversely arcuate rib in a cover and correspondingly form a strip and force the same against the rib, means for guiding the strip and cover into juxtaposition between the rolls, and means for imparting to the male roll a greater surface speed than that of the female roll, whereby the strip will be forced onto the rib with a substantial degree of tension.

7. An apparatus for applying a strip of molding or beading to a tire cover, comprising cooperating male and female rolls having transversely arcuate facing peripheral rib and groove portions, to simultaneously form a transversely arcuate rib in a cover and correspondingly form a strip and force the same against the rib, and means for imparting to the male roll a greater surface speed than that of the female roll, whereby the strip will be forced onto the rib with a substantial degree of tension.

8. An apparatus for applying a strip of molding or beading to a tire cover, comprising cooperating male and femals rolls having transversely arcuate facing peripheral rib and groove portions, to simultaneously form a transversely arcuate rib in a cover and correspondingly form a strip and force the same against the rib, means for imparting to the male roll a greater surface speed than that of the female roll, whereby the strip will be forced onto the rib with a substantial degree of tension, and means for wiping the grooved roll to prevent chips from engagement with and marring succeeding portions of the strip.

9. An apparatus for applying a strip of molding or beading to a tire cover, comprising cooperating male and female rolls having transversely arcuate facing peripheral rib and groove portions, to simultaneously form a transversely arcuate rib in a cover and correspondingly form a strip and force the same against the rib, means for imparting to the male roll a greater surface speed than that of the female roll, whereby the strip will be forced onto the rib with a substantial degree of tension, means for wiping the grooved roll to prevent chips from engagement with and marring succeeding portions of the strip, and means for minimizing the heat produced by the rolling operation.

10. An apparatus for applying a strip of molding or beading to a tire cover, comprising co-operating male and female rolls having transversely arcuate facing peripheral rib and groove portions, to simultaneously form a transversely arcuate rib in a cover and correspondingly form a strip and force the same against the rib, means for imparting to the male roll a greater surface speed than that of the female roll, whereby the strip will be forced onto the rib with a substantial degree of tension, and means for minimizing the heat produced by the rolling operation.

11. The method of attaching a strip of molding to a part of a tire cover which consists in creating relative movement between the strip and cover part to bring them together, contemporaneously imparting a transverse bow to contiguous portions of the strip and part with one bowed portion inside of the other, longitudinally tensioning the strip to draw it taut on the cover part, and securing it in such taut condition to the cover part.

12. The method of attaching a strip of molding to the surface of an arcuate part of a tire cover which consists in feeding the strip to said surface of the cover part, securing one end of the strip to the cover part, rolling the strip progressively about the cover part, contemporaneously tensioning the strip to cause it to be applied in taut condition to the cover part and securing the other end of the strip to the cover part while the strip is taut by pressing said end of the strip into interlocked engagement with said part.

13. In an apparatus for forming an arcuate spare tire cover part of transversely arched cross-section, forming means for engaging the arched portion of the cover part and guiding means on opposite sides of the cover part for engaging the edge portions of the same to align the cover part with said forming means as the cover part is longitudinally advanced relative to said forming means, said guiding means including a pair of guide disks made of relatively soft material so as not to mar said cover part.

14. The method of attaching a strip of molding to an annular part of a tire cover which consists in bringing the strip and cover part together, contemporaneously imparting a transverse bow to contiguous portions of the strip and part with one bowed portion inside of the other as they are advanced longitudinally through a circular path corresponding with the shape of the cover part and securing said bowed portions together in interfitted relation.

15. The method of attaching a strip of molding to an annular part of a tire cover which consists in bringing the strip and cover part together so that the strip is on the outer surface of the cover part, contemporaneously imparting a transverse bow to contiguous portions of the strip and part with one bowed portion inside of the other as they are advanced longitudinally through a circular path corresponding with the shape of the cover part and securing said bowed portions together in interfitted relation by pressing the ends of the strip into interlocked engagement with the inner surface of the cover part.

16. In a method of attaching a strip of molding to an arcuate tire cover, the steps of forming circumferentially spaced slits in the cover, placing the strip in overlying relation to the cover, inserting the ends of the strip through the slits so as to underlie the cover, and compressing the assembled strip and cover so as to cause the edges of the slits to bind the strip.

GEORGE ALBERT LYON.